Jan. 8, 1957

D. H. GREEN 2,776,504

STUMP EXTRACTOR

Filed Aug. 23, 1954

Donald H. Green
INVENTOR.

BY Clarence A. O'Brien
and Harvey B. Jacobson
Attorneys

United States Patent Office 2,776,504

Patented Jan. 8, 1957

2,776,504

STUMP EXTRACTOR

Donald H. Green, Kalispell, Mont.

Application August 23, 1954, Serial No. 451,404

1 Claim. (Cl. 37—2)

The present invention relates to new and useful improvements in stump extractors, and has for one of its important objects to provide, in a manner as hereinafter set forth, a device of this character which is adapted to be expeditiously mounted for use on the usual clearing blade of a dozer or other machine in lieu of certain of the teeth thereon.

Another very important object of the invention is to provide a stump extractor of the aforementioned character which is adapted to expeditiously split stumps of various sizes and remove them piecemeal, thereby subjecting the propelling vehicle to considerably less strain.

Other objects of the invention are to provide a stump extractor of the character described which will be comparatively simple in construction, strong, durable, highly efficient and reliable in use, and which may be manufactured at low cost.

All of the foregoing and still further objects and advantages of the invention will become apparent from a study of the following specification, taken in connection with the accompanying drawing, wherein like characters of reference designate corresponding parts throughout the several views, and wherein.

Figures 1, 2, 3:
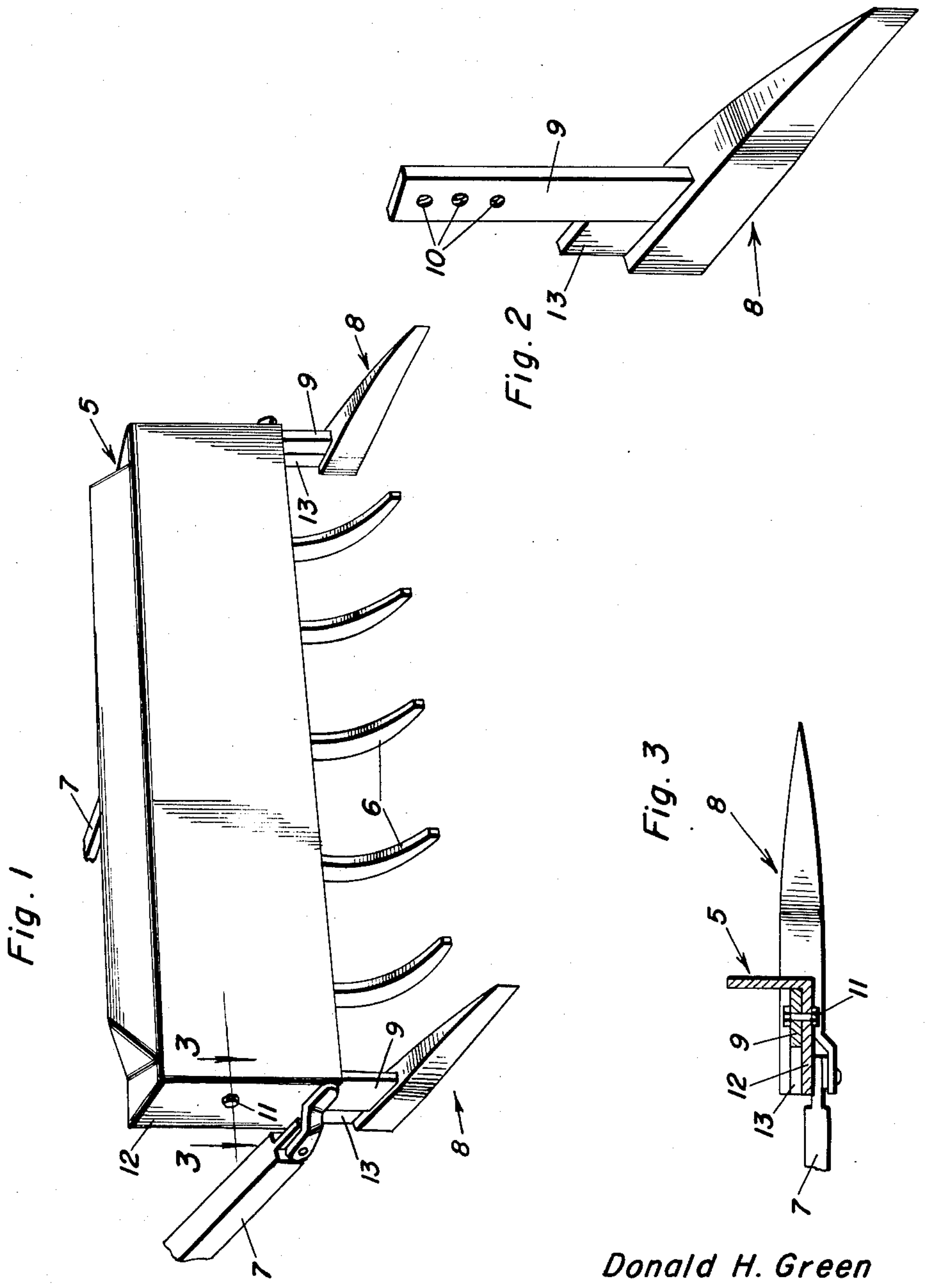
Figure 1 is a perspective view showing a pair of stump extractors in accordance with the present invention installed for use on the usual blade of a clearing machine.
Figure 2 is a perspective view of the device.
Figure 3 is a view in horizontal section, taken substantially on the line 3—3 of Figure 1.

Referring now to the drawing in detail, it will be seen that reference character 5 designates generally a conventional blade of a land clearing machine, said blade having mounted therebeneath a series of spaced, downwardly and forwardly curved teeth 6. The blade 5 is mounted on the usual vertically swingable arms 7 of a crawler tractor or other suitable vehicle.

The embodiment of the present invention which has been illustrated comprises a substantially wedge-shaped horizontal stump splitting tooth 8 of suitable metal. The tooth 8 is adapted to be removably mounted on the end portions of the clearing blade 5 in lieu of the outermost teeth 6 thereof. Toward this end, the tooth 8 has formed integrally with its rear portion an upstanding shank 9 which is engageable in the end portions of the blade 5 in the manner shown to advantage in Figure 3 of the drawing. The shank 9 has formed in its upper portion a series of spaced openings 10. A bolt 11 is engageable selectively in the openings 10 for adjustably securing the shank 9 in the blade 5, the end walls 12 of said blade being apertured to accommodate the bolts 11. A metallic reinforcing plate 13 is welded to the rear or heel portion of the tooth 8 and the adjacent lower portion of the shank 9.

It is thought that the manner in which the device is used will be readily apparent from a consideration of the foregoing. Briefly, the dozer or other vehicle approaches the stump to be removed and the forward end of one of the teeth 8 is engaged therewith. If the stump is a large one, the tooth 8 is engaged with a side portion thereof at a point adjacent the ground. The vehicle is then driven forwardly and the blade 8 is simultaneously elevated for splitting the stump and lifting the broken off piece out of the ground. For large stumps, the foregoing operation may be substantially repeated until the whole stump has been removed. The teeth 8 may be readily removed and the usual teeth substituted therefor on the clearing blade 5. However, the teeth 8 may also be used, if desired, for scarifying. By removing the stumps in the manner described, the high cost of dynamiting is saved and the relatively small pieces into which the stump is split may be readily burned. Still further, removal of the stumps piecemeal will permit the use of lighter machinery.

It is believed that the many advantages of a stump extractor constructed in accordance with the present invention will be readily understood, and although a preferred embodiment of the device is as illustrated and described, it is to be understood that changes in the details of construction may be resorted to which will fall within the scope of the invention as claimed.

What is claimed as new is as follows:

The combination with a land clearing machine blade having end walls interconnected by a front wall comprising a series of transversely spaced, downwardly and forwardly extending removable teeth, of a stump extractor including an elongated depending shank removably secured for vertical adjustment to the inner surface of an end wall and against the rear surface of the front wall of the blade in lieu of one of the teeth, and a substantially wedge-shaped stump splitting tooth fixed horizontally on the lower end of said shank and projecting forwardly therefrom beyond the remainder of the first-named teeth and in substantially the same horizontal plane, said stump splitting tooth having a rear end portion extending beyond the shank, and a reinforcing plate interconnecting the upper surface of the rear end portion of the tooth and the rear edge of the shank to counteract the forces exerted on the tooth by lifting with the front end thereof, the contact of the front edge of the shank with the rear surface of the front wall of the blade counteracting the rotational forces exerted on the upper end of the shank by pushing on the front end of the tooth.

References Cited in the file of this patent

UNITED STATES PATENTS

| | | |
|---|---|---|
| 2,081,192 | Allin et al. | May 25, 1937 |
| 2,238,094 | Allin | Apr. 15, 1941 |
| 2,477,477 | Cook | July 26, 1949 |
| 2,528,170 | Peacock | Oct. 31, 1950 |
| 2,626,468 | Dobrinich | Jan. 27, 1953 |